May 21, 1968  D. L. BOURGET  3,384,120
SPRING FAUCET
Filed Dec. 2, 1965
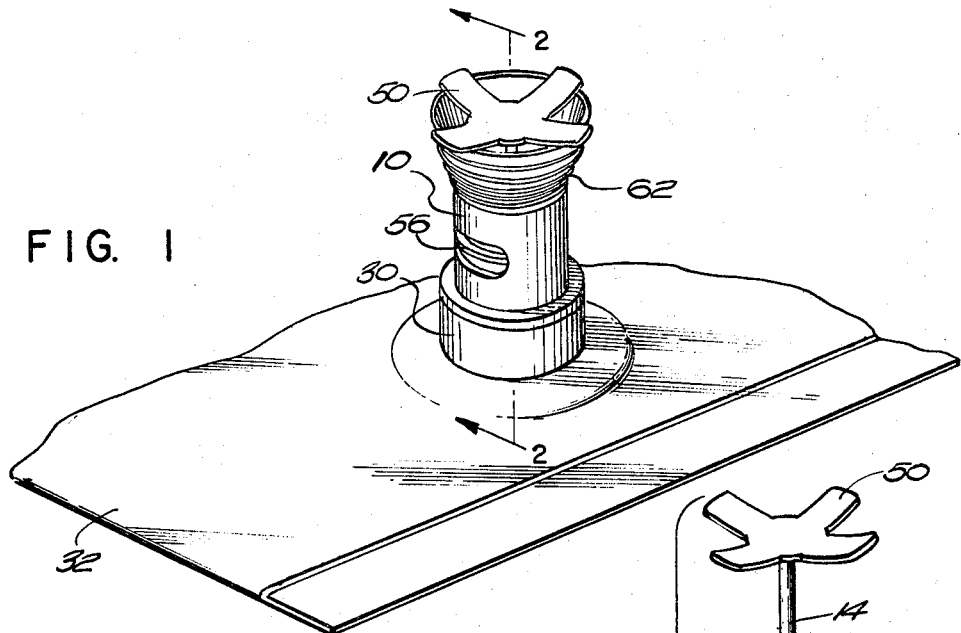
FIG. 1
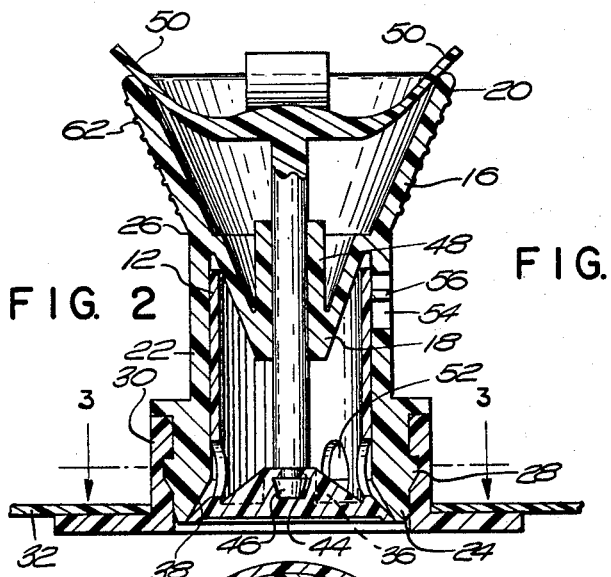
FIG. 2
FIG. 3
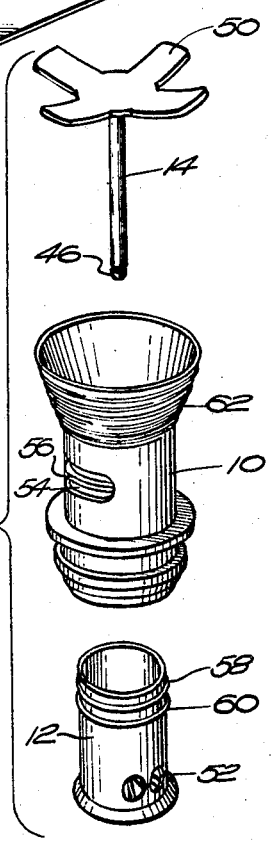
FIG. 4
INVENTOR.
DAVID L. BOURGET
BY
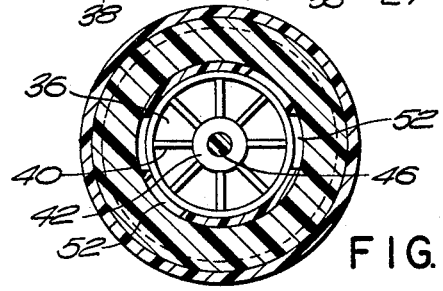
ATTORNEYS

United States Patent Office 3,384,120
Patented May 21, 1968

3,384,120
SPRING FAUCET
David L. Bourget, Brockton, Mass., assignor to Weyerhaeuser Company, Tacoma, Wash., a corporation of Washington
Filed Dec. 2, 1965, Ser. No. 511,053
8 Claims. (Cl. 137—625.39)

This invention relates to a spring faucet designed for use on a milk container consisting of a plastic bag fitted into a carton, but capable of use on other containers. It is an object of the invention to provide a faucet that can be so easily and cheaply made as to be a throw-away product, but that is also easy to operate, is dripless, and is adapted to aerate the liquid (such as milk) as it is being discharged through the faucet. As hereinafter described, the faucet is made of moldable synthetic resins, the parts being easily and quickly assembled without the use of tools. For a more complete understanding of the invention, reference may be had to the following decription thereof and to the drawings, of which FIGURE 1 is a perspective view of a faucet embodying the invention, the faucet being mounted on a waterproof plastic bag of which a fragment is shown;

FIGURE 2 is a section, on a larger scale, on the line 2—2 of FIGURE 1;

FIGURE 3 is a section on the line 3—3 of FIGURE 2; and

FIGURE 4 is an exploded perspective view of the faucet shown in FIGURE 1.

The faucet illustrated on the drawing consists of three parts, namely, a body or housing 10, a valve member 12, and a combined valve stem 14 and spring. The body 10 is cast as an integral unit, preferably of a tough synthetic resin such as a styrene polymer. It is formed with a hollow conical portion 16 which has a small end 18 and a large end 20, and a hollow cylindrical portion 22 one end of which is open at 24, the other end merging with the outer surface of the conical portion 16 at a line of juncture 26 substantially spaced from both ends of the conical portion so that the small end of the conical portion extends well into the cylindrical portion, the two portions being coaxial. The wall of the cylindrical portion 22 may be strengthened adjacent to the open end 24 by being cast with extra thickness. Near the open end 24 is an external circumferential rib 28 which conveniently snaps into an inner groove in a collar 30 which is the outlet for a bag 32 adapted to hold a quantity of liquid such as milk.

Slidably fitted in the cylindrical portion of the body 10 is the inner hollow cylinder or valve member 12. One end of this inner cylinder is open and it surrounds the part of the conical portion of the body which is within the cylindrical portion 22. The other end of the inner cylinder is closed by a transverse diaphragm 36 having an outwardly extending flange 38 which is arranged to act as a valve by engaging the end 24 of the cylindrical portion of the body as a valve seat. The periphery of the valve flange 38 is preferably chamfered, as is also the inner face of the end 24 of the body for a wedging action to ensure a tight closing of the valve when pressed against its seat. The inner face of the diaphragm 36 is made with a number of radially extending ribs 40 which meet at the center to form a boss 42. The latter is made with a socket 44 to receive and hold a knob 46 on the end of the valve stem 14 which extends through the small end of the conical portion 16 of the body and is coaxial therewith. As indicated in FIGURE 2, the socket 44 is undercut so that the knob 46 locks in the socket when pushed into it. Owing to the resilience of the material of which the diaphragm is made, the stem can be disengaged by a sufficiently strong pull. To keep the stem 14 aligned with the axis of the body 10, a bearing sleeve 48 may be formed within the conical portion 16 at the small end thereof.

To hold the valve yieldingly on its seat, a spring device is made integral with the stem 14 at the end thereof remote from the knob 46. As shown, the spring device consists of a plurality of leaves 50 extending radially from the end of the stem, four such leaves being shown by way of example. The length of the stem 14 is less than the overall length of the body 10 so that the leaves are flexed by engagement with the rim of the conical portion of the body at its large end 20. This tension on the leaves 50 holds the valve 38 on its seat. To open the valve, the operator grips the conical portion 16 between the forefinger and middle finger of his hand and presses the end of the stem 14 with his thumb. This moves the valve from its seat and exposes to the interior of the container 32 portions of a number of apertures 52 through the wall of the inner cylinder 12 so that liquid from the container flows into the interior of the inner cylinder 12. The opening movement of the valve also moves the inner end of the inner cylinder clear of a discharge port 54 through the wall of the cylindrical portion 22 of the body near the line of its juncture with the conical portion 16. To divide the flow of liquid discharging through the port 54, a thin partition element 56 extends across the port. This serves to aerate the liquid by promoting the formation of foam in the discharging stream. The smaller end of the conical portion of the body 10 projects well into the interior of the cylindrical portion and serves to guide the stream of liquid approaching the discharge port.

To avoid binding or sticking of the valve member 12 within the body 10, a very slight clearance is provided between the valve member and the inside surface of the cylindrical portion 22 of the body. To seal that clearance, two small circumferential ribs 58, 60 are formed on the valve member 12 as indicated in FIGURE 4. These ribs rub against the inner surface of the cylindrical portion of the body and effectively seal the clearance against leakage along the outside of the valve member 12. When the valve is closed, as in FIGURE 2, the rib 58 is just above the port 54 and the rib 60 is just below the port. These small ribs (which are not indicated in FIGURE 2) thus form an additional seal against the escape of liquid when the valve is closed. When the valve is moving to its closed position after having been opened, the rib 58 has the important function of wiping across the port 54 to discharge the last drop of liquid in the port, then sealing the valve to prevent any subsequent drip.

To keep the fingers of the operator from slipping on the outer surface of the conical portion 16 when the thumb is pressing on the end of the stem 14, a series of small corrugations or circumferential ribs 62 may be formed on that surface.

The three molded members of the structure are quickly and easily assembled by inserting the valve member 12 into one end of the body 10 and holding it in place while a stem 14 is thrust through the small end 18 of the conical portion 16 and pressed to engage the knob 46 in the socket 44. The device is then ready to be snapped into place in the collar 30 of the outlet of a container 32.

I claim:

1. A faucet comprising a body member having a hollow cylindrical portion with an open end and a discharge port through the cylindrical wall at a point substantially spaced from said open end, a hollow inner cylinder slidably fitted in said body member, said inner cylinder having a diaphragm closing one end thereof and a flange extending radially from said diaphragm and adapted to serve as a valve by engaging the open end of said cylindrical portion of the body as its valve seat to close said open end, said inner cylinder having an aperture through its cylindrical wall near its closed end to provide a passage for liquid into the interior of the inner cylinder when said valve is lifted from its seat, said inner cylinder extending beyond and closing said discharge port when said valve is on its seat, said inner cylinder having two small circumferential ribs integrally formed on its outer surface on opposite sides of said discharge port when the valve is on its seat, said ribs rubbing against the wall of said cylindrical portion of the body member when the inner cylinder is moved, means resiliently pressing said valve on its seat and manually operable to move said valve from its seat.

2. A faucet as described in claim 1, said cylindrical portion of the body having a thin partition element in said discharge port extending across said port and circumferentially of said body.

3. A faucet as described in claim 1, said body having a conical portion with a large end and a small end, an end of said cylindrical portion merging with the outer surface of said conical portion at a line of juncture spaced from both ends of the conical portion, said valve pressing means comprising a stem extending through the small end of the conical portion of the body and secured at one end to said closed end of the inner cylinder and a plurality of ears extending radially from said stem and engaging on the rim of said conical portion of the body.

4. A faucet as described in claim 3, said diaphragm having on its inner face a series of radially extending ribs meeting at the center to form a boss having a socket therein, said stem having a knob on an end thereof engaged in said socket.

5. A faucet as described in claim 4, said inner cylinder having two small circumferential ribs on its outer surface on opposite sides of said discharge port when the valve is on its seat, said cylindrical portion of the body having a thin partition element in said discharge port extending across said port, said diaphragm having a central socket on its inner face, said stem having a terminal knob engaging in said socket.

6. Means for positioning a member and for biasing said member from a first to a second position comprising,
a frame,
attachment means slidably mounted on said frame,
a biasing means comprising,
a camming surface and
resilient fingers engaging said surface when said member is in said first position,
one of said elements of said biasing means being attached to said frame and the other being attached to said attachment means.

7. The positioning means of claim 6 in which said camming surface is conical.

8. The positioning means of claim 7 in which said conical camming surface is attached to said frame and said resilient fingers are attached to said attachment means and engage the inner surface of said cone.

References Cited

UNITED STATES PATENTS

| | | | |
|---|---|---|---|
| 2,628,062 | 2/1953 | Weber | 251—322 |
| 2,713,988 | 7/1955 | Kitterman | 251—322 |

FOREIGN PATENTS

| | | |
|---|---|---|
| 48,825 | 2/1910 | Switzerland. |
| 64,738 | 6/1955 | France. |
| 703,261 | 2/1965 | Canada. |
| 1,078,463 | 5/1954 | France. |

M. CARY NELSON, *Primary Examiner.*

A. ROSENTHAL, *Examiner.*